United States Patent
Rowlan

(10) Patent No.: US 7,190,303 B2
(45) Date of Patent: Mar. 13, 2007

(54) SYSTEMS AND METHODS EMPLOYING A COLLISION AVOIDANCE SYSTEM TO ENHANCE PILOT AWARENESS

(75) Inventor: Stacey R. Rowlan, Phoenix, AZ (US)

(73) Assignee: Aviation Communication & Surveillance Systems, LLC, Phoenix, AZ (US)

( * ) Notice: Subject to any disclaimer, the term of this patent is extended or adjusted under 35 U.S.C. 154(b) by 193 days.

(21) Appl. No.: 10/813,911

(22) Filed: Mar. 30, 2004

(65) Prior Publication Data

US 2005/0219113 A1    Oct. 6, 2005

(51) Int. Cl.
*G01S 13/93* (2006.01)
*G08G 5/04* (2006.01)

(52) U.S. Cl. .......................... 342/29; 342/57; 342/182; 340/961

(58) Field of Classification Search .................. 342/29, 342/57, 182; 340/961; 701/301
See application file for complete search history.

(56) References Cited

U.S. PATENT DOCUMENTS

| | | | |
|---|---|---|---|
| 4,674,710 A | 6/1987 | Rodriguez | |
| 4,866,450 A | 9/1989 | Chisholm | |
| 6,262,679 B1 * | 7/2001 | Tran | 342/29 |
| 6,271,768 B1 | 8/2001 | Frazier, Jr. et al. | |
| 6,278,396 B1 | 8/2001 | Tran | |
| 6,459,411 B2 | 10/2002 | Frazier et al. | |
| 6,531,978 B2 | 3/2003 | Tran | |
| 6,911,936 B2 * | 6/2005 | Stayton et al. | 342/182 |
| 2003/0122701 A1 | 7/2003 | Tran | |
| 2003/0137444 A1 * | 7/2003 | Stone et al. | 342/182 |

FOREIGN PATENT DOCUMENTS

WO    WO 03/060855    7/2003

OTHER PUBLICATIONS

Lt. Col. Pedro Rivas, "Military Unique Applications for ADS-B," U.S. Air Force (Unclassified), 25 pgs., Apr. 3, 2001.
"Stationkeeping Follow-On (SFO) Technology: SFO/EMPRS," 30 pgs., date unknown.
"SFO: Stationkeeping Follow On Technology, Self Organizing Situational Awareness," Sierra Research, Integrated Defense Technologies Company, 23 pgs., Aug. 25, 2000.
"101 Things You Always Wanted To Know About the C-130)" pp. 1-24, retrieved from the internet on Apr. 22, 2003: <URL www.fas.org/man/dod-101/sys/ac/docs/101_Things.htm.
Walter B. Gordon & James R. Doane, "Next-Generation Situational Awareness," Flight Deck International 6 pgs. date unknown.

(Continued)

*Primary Examiner*—Dan Pihulic
(74) *Attorney, Agent, or Firm*—Allen J. Moss; Squire, Sanders & Dempsey L.L.P.

(57) ABSTRACT

Systems and methods relate to an aircraft with a CAS that may be employed to enhance pilot awareness. The CAS may be employed on a formation member aircraft to provide a TA that is distinctive for an intruding formation member aircraft, as opposed to a TA provided as a result of an intruding nonmember aircraft. The CAS may also provide a plurality of status indications for aircraft engaged in airborne refueling, as well as aural indications of the present mode of operation for the CAS.

23 Claims, 6 Drawing Sheets

OTHER PUBLICATIONS

"AN/APN-243(V) and Growth Provisions to AN/APN-243A(V) SKE 2000 Expanded System Information," Sierra Technologies, Inc., Buffalo, NY, 4 pgs. date unknown.

"Military Airborne Surveillance System [MASS] Military Enhanced TCAS-The Next Generation, Mass The Flexible Solution," Aviation Communication & Surveillance Systems, Phoenix, Arizona, 2 pgs. date unknow.

"TCAS 2000 Traffic Alert and Collision Avoidance System, TCAS It's Plane Better," Aviation Communication & Surveillance Systems,Phoenix, Arizona, 2 pgs., Dec. 2002.

"Honeywell Military ACAS Systems, ETCAS AN/APN-244," pp. 1-7, date unknown.

"TCAS The Best Airborne Collision Avoidance Protection Available, ETCAS TPA-81A," pp. 1-2, retrieved from the internet on Apr. 30, 2003: <URL: www.honeywelltcas.com/etcas_tpa81a.htm.

"The Optimization for Airborn Aircraft Separation," "Airborne Collision Avoidance System (ACAS)—Traffic Alert and Collision Avoidance System (TCAS)," 12 pgs., retrieved from the omtermet on May 19, 2003: <URL: www.eos.tuwien.ac.at/Oeko/RSchild/Rules/id80_m.htm.

"TCAS The Best Airborne Collision Avoidance Protection Available, TCAS Glossary of Terms," pp. 1-5, retrieved from the internet on Jun. 2, 2003: < URL: www.honeywelltcas.com/glossary.htm.

* cited by examiner

SYSTEMS AND METHODS EMPLOYING A COLLISION AVOIDANCE SYSTEM TO ENHANCE PILOT AWARENESS

FIELD OF THE INVENTION

The present invention relates to a collision avoidance system (CAS), and, more particularly, to systems and methods of employing a CAS to enhance pilot awareness.

BACKGROUND OF THE INVENTION

An aircraft with a CAS may provide a pilot with information that may enhance the pilot's awareness of situations pertaining to the aircraft (e.g., situational awareness). For example, a CAS display may show a symbol for the pilot's own aircraft, as well as symbols for other aircraft detected within the surveillance volume for the CAS, thereby providing the pilot with situational awareness. A CAS may also provide situational awareness by providing to the pilot traffic advisories (TAs) and resolution advisories (RAs).

An RA is information that may be provided by the CAS to the pilot to recommend a maneuver to increase separation relative to an intruding aircraft. RA information typically consists of a visual indication, changing a displayed symbol for the intruding aircraft, and an aural indication, an announcement played on a CAS speaker recommending a maneuver, such as "climb climb." Before an RA is provided, the CAS may typically provide a TA, information that does not recommend a maneuver to the pilot, but does indicate that an intruding aircraft has reached a predefined condition representing some collision risk. TA information typically consists of a visual indication, changing a displayed symbol for the intruding aircraft, and an aural indication, an announcement played on the CAS speaker consisting of "traffic traffic."

A present-day CAS does not distinctly indicate to a pilot in an aircraft that is a member of a formation whether a TA is caused by another formation member aircraft or by a nonmember of the formation. A pilot in a formation member aircraft that receives a TA based on another formation member has the same type of visual and aural indications that would have been received had the TA been based on a nonmember of the formation.

A present-day CAS also provides neither status indications for aircraft engaged in airborne refueling, nor aural indications of the present mode of operation for the CAS.

SUMMARY OF THE INVENTION

In accordance with an embodiment of the invention, a method is disclosed for employing a CAS for an aircraft that is a member of a formation to distinguish between members and nonmembers of the formation. The method may comprise providing a signal used to indicate only that one or more other formation member aircraft has attained at least one of a predefined spatial condition and a predefined temporal condition.

In accordance with another embodiment of the invention, a method is disclosed for employing a CAS for an aircraft that is engaged in a refueling operation. The method may comprise providing a signal used to indicate attainment of a predefined condition for the refueling operation.

In accordance with yet another embodiment of the invention, a method is disclosed for employing a CAS for an aircraft to enhance awareness of operation of the CAS. The method may comprise providing a signal used to aurally indicate a change in a mode of operation of the CAS.

In accordance with still another embodiment of the invention, a method is disclosed for employing a CAS for an aircraft to enhance awareness of operation of the CAS. The method may comprise providing a signal used to indicate a change in a mode of operation of the CAS, and modifying a displayed view of an own aircraft symbol in response to the signal.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWING

Embodiments of the present invention will now be further described with reference to the drawing, wherein like designations denote like elements, and.

DESCRIPTION OF THE EMBODIMENTS

Reference will now be made in detail to the present exemplary embodiments of the invention, examples of which are illustrated in the accompanying drawings. Wherever possible, the same reference numbers will be used throughout the drawings to refer to the same or like parts.

Figure 1:
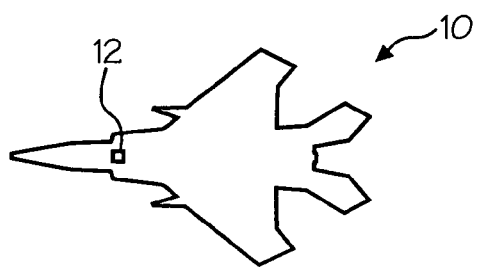
FIG. 1 is a plan view of an aircraft with a CAS, in accordance with systems and methods of the present invention.

Referring to FIG. 1, a simplified plan view shows an aircraft 10 with a CAS 12. Aircraft 10 is shown as one type of military aircraft, however, aircraft 10 may comprise any type of military, civilian or other type of aircraft. More generally, aircraft 10 may comprise any vehicle for traveling through the air, including but not limited to a balloon, a zeppelin, a glider, a helicopter, a turboprop aircraft, a jet aircraft, a rocket and any combinations thereof. Such combinations may include, but are not limited to vertical takeoff and landing (VTOL) aircraft.

Figure 2A:
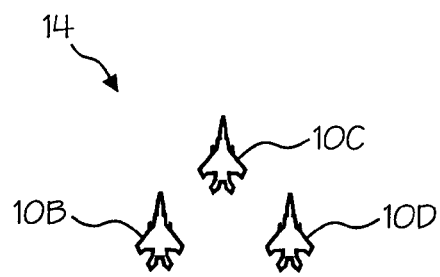
FIG. 2A is a plan view of an aircraft formation that includes a formation member aircraft approaching to join a plurality of aircraft already in formation, in accordance with systems and methods of the present invention.
Figure 2B:
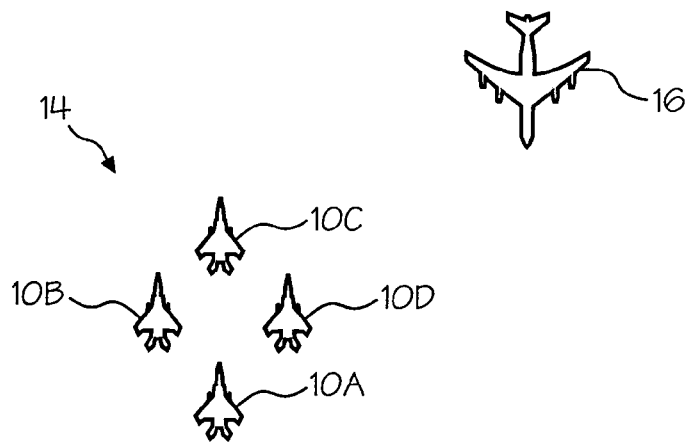
FIG. 2B is a plan view of the formation of FIG. 2A approaching another aircraft that is not a member of the formation, in accordance with systems and methods of the present invention.

Referring to FIGS. 2A and 2B, a formation 14 is shown comprising aircraft 10A–10D. As shown in FIG. 2A, aircraft 10A has not yet taken position in formation 14, however, aircraft 10A is a member of formation 14. FIG. 2B shows aircraft 10A in position in formation 14, which resembles a diamond-like pattern, however, formation 14 may comprise any arrangement of two or more aircraft in any predefined manner or for any particular purpose. Moreover, aircraft 10A–10D in formation 14 may comprise military aircraft, civilian aircraft, any other type of aircraft, or any combinations thereof. Aircraft 16 is not a member (i.e., a nonmember) of formation 14. Aircraft 16 may comprise a military, civilian or any other type of aircraft. In a variation, a plurality of aircraft may be substituted for aircraft 16, the substituted plurality comprising military aircraft, civilian aircraft, any other type of aircraft or any combinations thereof. Moreover, all, none or some of the substituted plurality of aircraft may comprise one or more other aircraft formations.

As used herein, a CAS refers to any aircraft system that may use a signal from at least one of the air traffic control radar beacon system (ATCRBS), air traffic control mode S (ATC mode S) and the automatic dependent surveillance-broadcast (ADS-B) for at least one of airborne surveillance and collision avoidance functions. Such a CAS includes, but is not limited to any version of any system that may be referred to as an airborne collision avoidance system (ACAS), a traffic collision avoidance system (TCAS) and an enhanced traffic alert and collision avoidance system (ET-CAS). Also representing such a CAS is CAS 12, shown in FIG. 3 as a simplified block diagram.

CAS 12 may include an antenna 18, a computer unit 20, a storage system 22, a transponder 26, a display 28, a controller 30 and a speaker 32. In a variation, any combinations of antenna 18, computer unit 20, storage system 22, transponder 26, display 28, controller 30 and speaker 32 may be used. For example, CAS 12 may combine computer unit 20 with storage system 22, display 28 with speaker 32, and/or other combinations that those skilled in the art may appreciate.

Antenna 18 may comprise any one or more antennas, which may be used to receive and/or transmit any desired signal for CAS 12. Typically, CAS 12 may include more than one antenna 18, such as one or more omnidirectional and directional antennas (not shown).

Computer unit 20 may comprise any one or more computer units, which may perform desired CAS functions, including but not limited to airborne surveillance and collision avoidance. Computer unit 20 may include a receiver, a transmitter and a processor to perform such CAS functions.

Storage system 22 may comprise any one or more electronic storage devices, including but not limited to one or more of random-access memory (RAM), read-only memory (ROM), programmable read-only memory (PROM), erasable programmable read-only memory (EPROM) and electrically erasable programmable read-only memory (EEPROM). Storage system 22 may have one or more programs and/or data 24, which may be accessed for execution by computer unit 20 to perform processes in accordance the present invention.

Transponder 26 may comprise any one or more transponders, which may perform desired CAS transponder functions, including but not limited to transmitting and/or receiving signals of at least one of ATCRBS, ATC mode S and ADS-B.

Display 28 may comprise any one or more displays, which visually indicate desired CAS information. Such information may include, but is not limited to displayed symbols representing own aircraft and other aircraft within a defined CAS surveillance volume.

Speaker 32 may comprise any one or more speakers, which aurally indicate desired CAS information. Such information may include, but is not limited to TAs and RAs.

Controller 30 may comprise any one or more controllers, which may permit control of CAS 12, as desired. Controller 30 may include one or more selectors, such as one or more switches, dials or the like with one or more selectable positions to select desired modes of operation. CAS modes of operation may include, but are not limited to OFF, TA ONLY, TA/RA and FORMATION, though various other names may apply. In the OFF mode, CAS 12 is off. In the TA ONLY mode, CAS 12 may provide situational awareness that may include TAs. In the TA/RA mode, CAS 12 may provide situational awareness that may include TAs and RAs.

In the FORMATION mode, CAS 12 may provide at least two manners of operation, depending on whether aircraft 10 is in formation. In one instance with CAS 12 in FORMATION mode and aircraft 10 not in formation, CAS 12 may provide situational awareness that may include TAs and RAs. In another instance with CAS 12 in FORMATION mode and aircraft 10 in formation, CAS 12 may provide situational awareness that may include TAs for nonmember aircraft, non-TA indications for formation member aircraft and no RAs. In a variation of FORMATION mode, CAS 12 may provide at least two manners of operation, depending on a factor other than whether aircraft 10 is in formation, such as by position of a selector on controller 30.

Providing such non-TA indications for formation member aircraft may also be used with any other modes of operation for CAS 12, including but not limited to the TA ONLY and TA/RA modes. In such a modified TA ONLY mode, CAS 12 may provide situational awareness that may include TAs for nonmember aircraft and non-TA indications for formation member aircraft. In such a modified TA/RA mode, CAS 12 may provide situational awareness that may include TAs for nonmember aircraft, non-TA indications for formation member aircraft and RAs.

Figure 3:
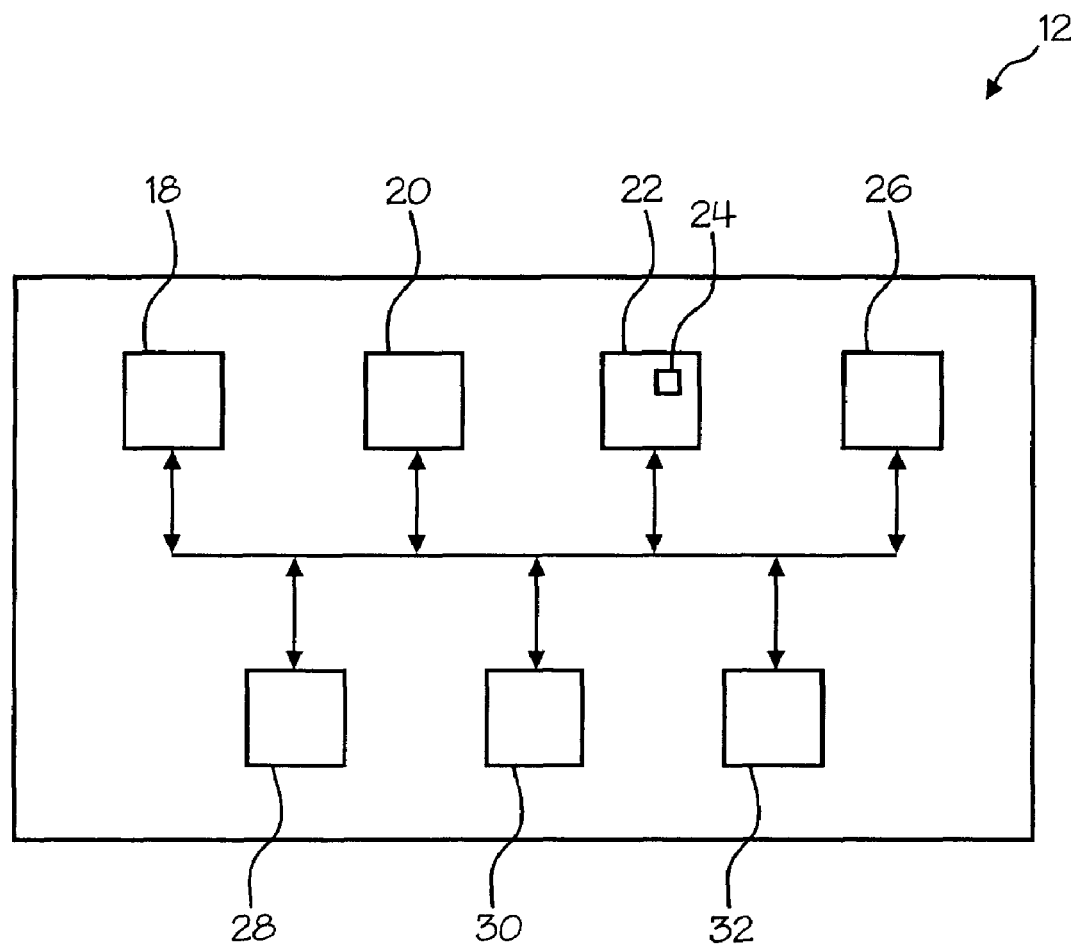
FIG. 3 is a block diagram of the CAS of FIG. 1, in accordance with systems and methods of the present invention.
Figure 4:
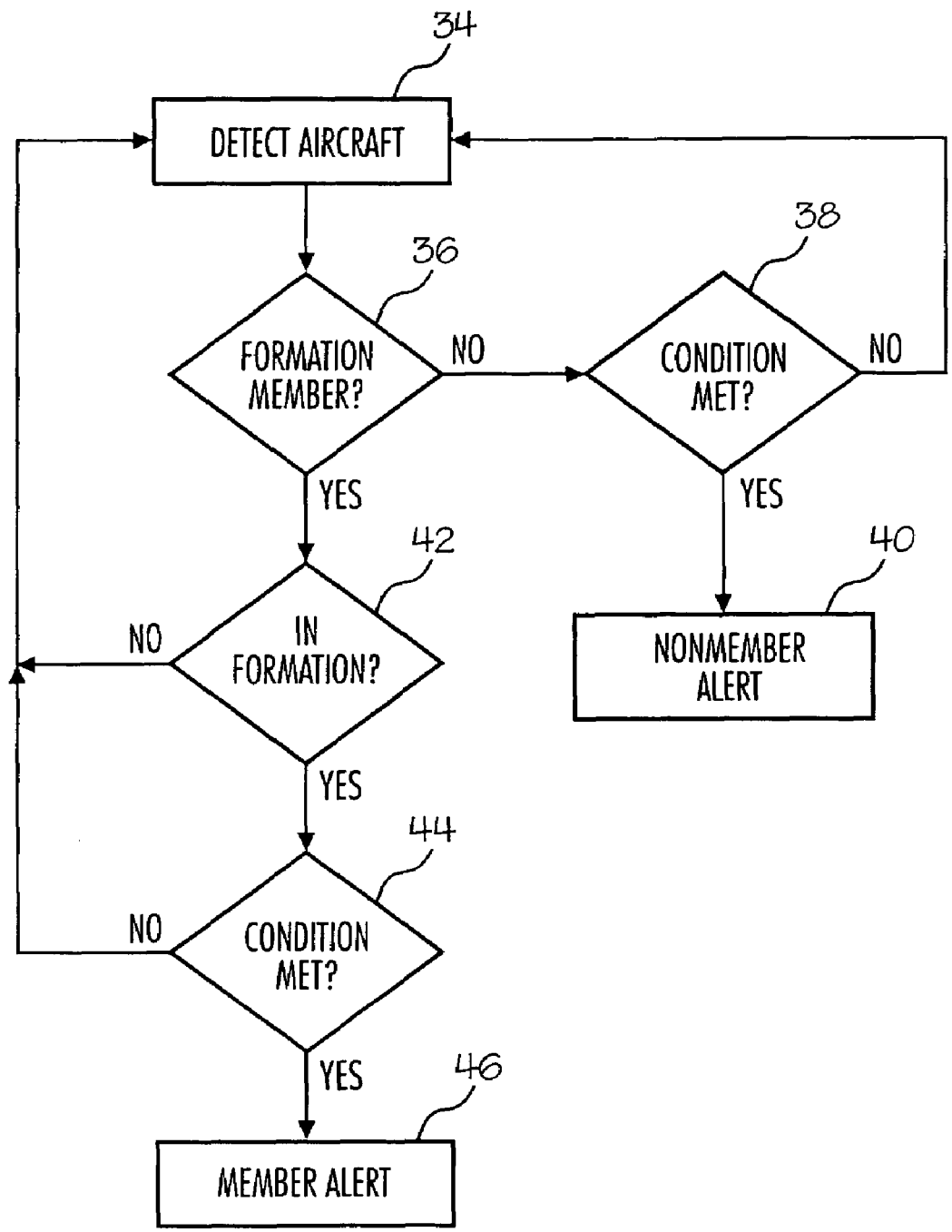
FIG. 4 is a flowchart representing a method of employing the CAS of FIG. 3 to distinguish between members and nonmembers of the aircraft formation of FIG. 2B, in accordance with systems and methods of the present invention.

Referring to FIG. 4, a flowchart depicts a method of employing CAS 12 to distinguish between members 10A–10D and a nonmember 16 of aircraft formation 14 in FIG. 2B. Those skilled in the art appreciate that one or more programs and/or data 24 in storage system 22 may be utilized by computer unit 20 to so direct and coordinate operation of CAS 12, as shown in FIG. 3.

For purposes of setting a context, the following process is described from the point of view of formation member aircraft 10A, though it may similarly apply to any other formation member aircraft 10B–10D. Additionally, in the context of describing this process, CAS 12 on formation member aircraft 10A is assumed to be in the FORMATION mode.

In step 34, formation member aircraft 10A may detect with computer unit 20 of CAS 12 other formation member aircraft 10B–10D and nonmember aircraft 16. Symbols representing such aircraft may be shown on display 28 for situational awareness.

In step 36, formation member aircraft 10A may determine with computer unit 20 of CAS 12 whether detected aircraft are members of formation 14. For such a determination, formation members 10A–10D may broadcast identifying information to CAS 12, or to any other system. Such information may include an aircraft identification code associated with formation 14 or any other information that may identify formation members 10A–10D as members of formation 14. Based on the determination of step 36, the process passes to step 38 for nonmember aircraft 16 and to step 42 for formation members 10B–D.

In step 38, formation member aircraft 10A may determine with computer unit 20 of CAS 12 whether a predefined condition is met for nonmember aircraft 16. Any predefined condition that triggers a TA may be utilized, such as a projected time-to-impact falling below a predefined minimum time limit or a distance between aircraft falling below a predefined minimum spatial limit. Based on the determination of step 38, the process passes to step 34 when nonmember aircraft 16 has not met a predefined condition for CAS 12 to issue a TA to aircraft 10A and to step 40 when such a condition is met.

In step 40, formation member aircraft 10A may receive a TA from CAS 12 to signify that nonmember aircraft 16 has met a predefined condition for a TA. Such a TA may be generated by computer unit 20 to change a symbol shown on display 28 for nonmember aircraft 16 and to announce "traffic traffic" over speaker 32 to alert the occupant(s) of aircraft 10A of the status of nonmember aircraft 16.

In step 42, formation member aircraft 10A may determine with computer unit 20 of CAS 12 whether aircraft 10A is in formation, as exemplified by FIG. 2B, as opposed to FIG. 2A. To make such a determination, computer unit 20 may consider any information, such as range, bearing and/or elevation, flight ID, Mode 2 4096 Mode, or Mode 3/A code that may be communicated in any way, such as by electronic transmission between formation member aircraft 10A–10D. With such information, CAS 12 may determine when aircraft 10A meets a predefined condition indicating that aircraft 10A is in formation according to CAS 12. CAS 12 may automatically determine that aircraft 10A is in formation when, for example, aircraft 10A meets a predefined spatial condition with respect to one or more of aircraft 10B–10D. Based on the determination of step 42, the process passes to step 34 when aircraft 10A is not yet in formation 14 and to step 44 when it is in formation.

In step 44, formation member aircraft 10A may determine with computer unit 20 of CAS 12 whether one or more of the other formation member aircraft 10B–10D has attained one or more of a predefined spatial condition and a predefined temporal condition. A predefined spatial condition may comprise any predefined spatial threshold that may indicate that one or more of aircraft 10B–10D may be operating with some degree of danger with respect to aircraft 10A. For example, one or more of aircraft 10B–10D may fall below a minimum limit for a predefined range and/or elevation threshold with respect to aircraft 10A. A predefined temporal condition may comprise any predefined temporal threshold that may indicate that one or more of aircraft 10B–10D may be operating with some degree of danger with respect to aircraft 10A. For example, one or more of aircraft 10B–10D may fall below a minimum limit for a predefined time-to-impact threshold with respect to aircraft 10A. In making such a determination, computer unit 20 may consider any spatial and/or temporal information that may be communicated in any way between formation member aircraft 10A–10D, which may include but is not limited to one or more of a three-dimensional position or fix, bearing, range, elevation, velocity and acceleration. Based on the determination of step 44, the process passes to step 34 when neither a predefined spatial condition, nor a predefined temporal condition is met and to step 46 when one or both conditions are met.

In step 46, a formation member alert may be provided in response to a signal that may be provided by computer unit 20 of CAS 12 to indicate to the occupant(s) of formation member aircraft 10A that one or more of aircraft 10B–10D has attained one or more of a predefined spatial condition and a predefined temporal condition. Those skilled in the art understand that the signal that causes issuance of the formation member alert may be provided from any part of CAS 12 or elsewhere on aircraft 10A. The formation member alert may indicate to the occupant(s) of formation member aircraft 10A that a potentially unsafe condition may exist between formation member aircraft 10A and one or more of formation member aircraft 10B–10D, which may require a response from formation member aircraft 10A to reduce the danger.

The formation member alert may provide such indication in any way, including but not limited to visually and/or aurally. Display 28 may provide a visual indication of a formation member alert by, for example, changing the appearance of one or more of formation member aircraft 10B–10D causing issuance of the formation member alert. Speaker 32 may provide an aural indication of a formation member alert by, for example, playing any unique sound or series of sounds that inform the occupant(s) of aircraft 10A that one or more of formation member aircraft 10B–10D have caused issuance of the formation member alert. Such a unique sound or series of sounds may comprise any, such as an announcement, that is not a TA (i.e., "traffic traffic") pertaining to nonmember aircraft 16. Such an aural indication may comprise an announcement, including but not limited to any one or more of "monitor member," "traffic monitor traffic," "monitor traffic," "member traffic," "encroachment" and "monitor encroachment."

Figure 5:
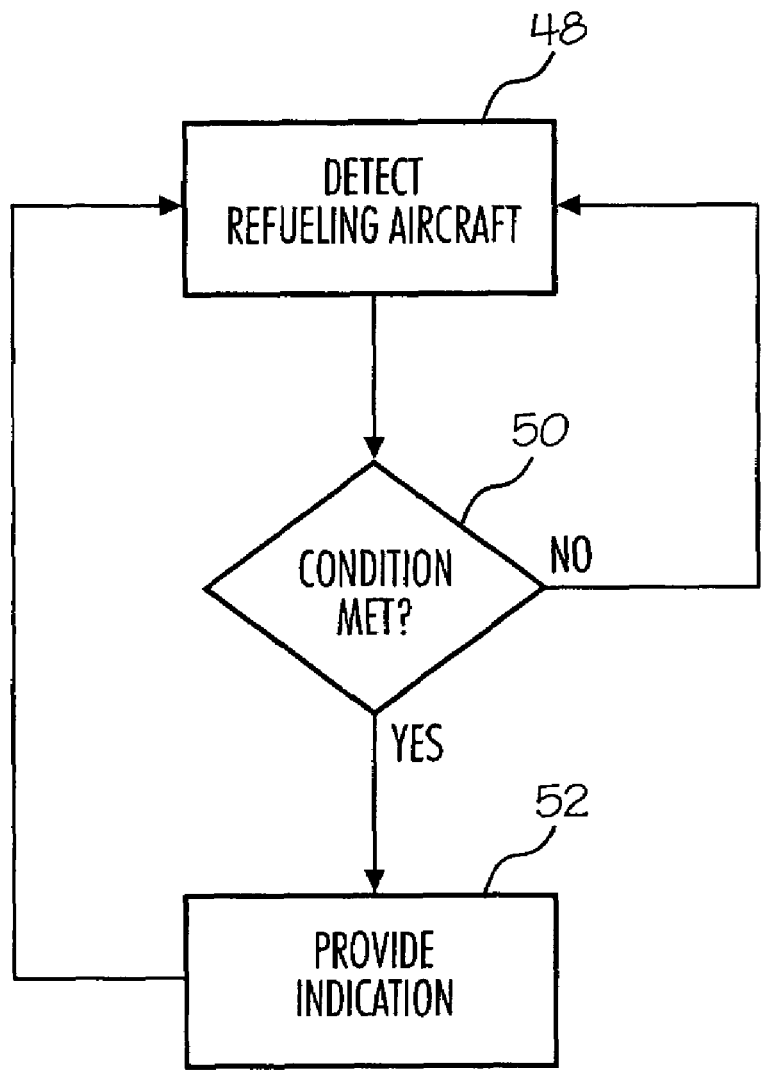
FIG. 5 is a flowchart representing a method of employing the CAS of FIG. 3 to facilitate aircraft engaged in airborne refueling, in accordance with systems and methods of the present invention.

Referring to FIG. 5, a flowchart depicts a method of employing CAS 12 for a tanker aircraft that is engaged in airborne refueling with a receiver aircraft. Those skilled in the art appreciate that one or more programs and/or data 24 in storage system 22 may be utilized by computer unit 20 to so direct and coordinate operation of CAS 12, as shown in FIG. 3.

For purposes of setting a context, the tanker aircraft and the receiver aircraft may be engaged in the refueling operation from at least the approach of the receiver aircraft to connect with the tanker aircraft to at least the departure of the receiver aircraft from the tanker aircraft, whether or not the receiver aircraft actually connects with and receives fuel from the tanker aircraft. Also, CAS 12 on the tanker aircraft is assumed to be in a REFUELING mode, which may be selected with controller 30. The receiver aircraft need not, but may have selected the same mode of CAS operation. While the indications are delineated below from the context of the refueling aircraft, similar indications may be provided on the receiver aircraft.

In step 48, the tanker aircraft may detect with computer unit 20 of CAS 12 the receiver aircraft, which may or may not be a formation member aircraft. A symbol representing the receiver aircraft may be shown on display 28 for situational awareness on the tanker aircraft. Symbols for other aircraft that may be detected by the tanker aircraft may also be shown on display 28.

In step 50, the tanker aircraft may determine with computer unit 20 of CAS 12 whether a predefined condition is attained for the receiver aircraft, which may comprise one or more of a predefined spatial condition and a predefined temporal condition. In this context, a predefined spatial condition may comprise any predefined spatial threshold relating in any way to the refueling operation, such as any threshold horizontal or vertical distance between the tanker aircraft and the receiver aircraft. In this context, a predefined temporal condition may comprise any predefined temporal threshold relating in any way to the refueling operation, such as any threshold time-to-reach a specified distance between the tanker aircraft and the receiver aircraft. In making such a determination, computer unit 20 may consider any spatial and/or temporal information that may be communicated in any way between the tanker aircraft and the receiver aircraft, which may include but is not limited to one or more of a three-dimensional position or fix, bearing, range, elevation, velocity and acceleration. Based on the determination of step 50, the process passes to step 48 when no predefined condition is attained and to step 52 when at least one predefined condition is attained.

In step 52, an indication may be provided in response to a signal that may be provided by computer unit 20 of CAS 12 to indicate to the occupant(s) of the tanker aircraft that the receiver aircraft has attained one or more predefined conditions for the refueling operation. Those skilled in the art understand that the signal that causes issuance of such an indication may be provided from any part of CAS 12 or elsewhere on the tanker aircraft. Such an indication may be provided in any way, including but not limited to visually and/or aurally. Display 28 may provide a visual indication by, for example, changing the appearance the receiver aircraft as it reaches a specified point of interest to the tanker aircraft. Speaker 32 may provide an aural indication by, for example, playing any unique sound or series of sounds that inform the occupant(s) of the tanker aircraft that the receiver aircraft has reached a specified point of interest to the tanker aircraft. Such a unique sound or series of sounds may comprise any, such as an announcement, that may communicate to the tanker aircraft a point of interest regarding the refueling operation.

Figure 6:
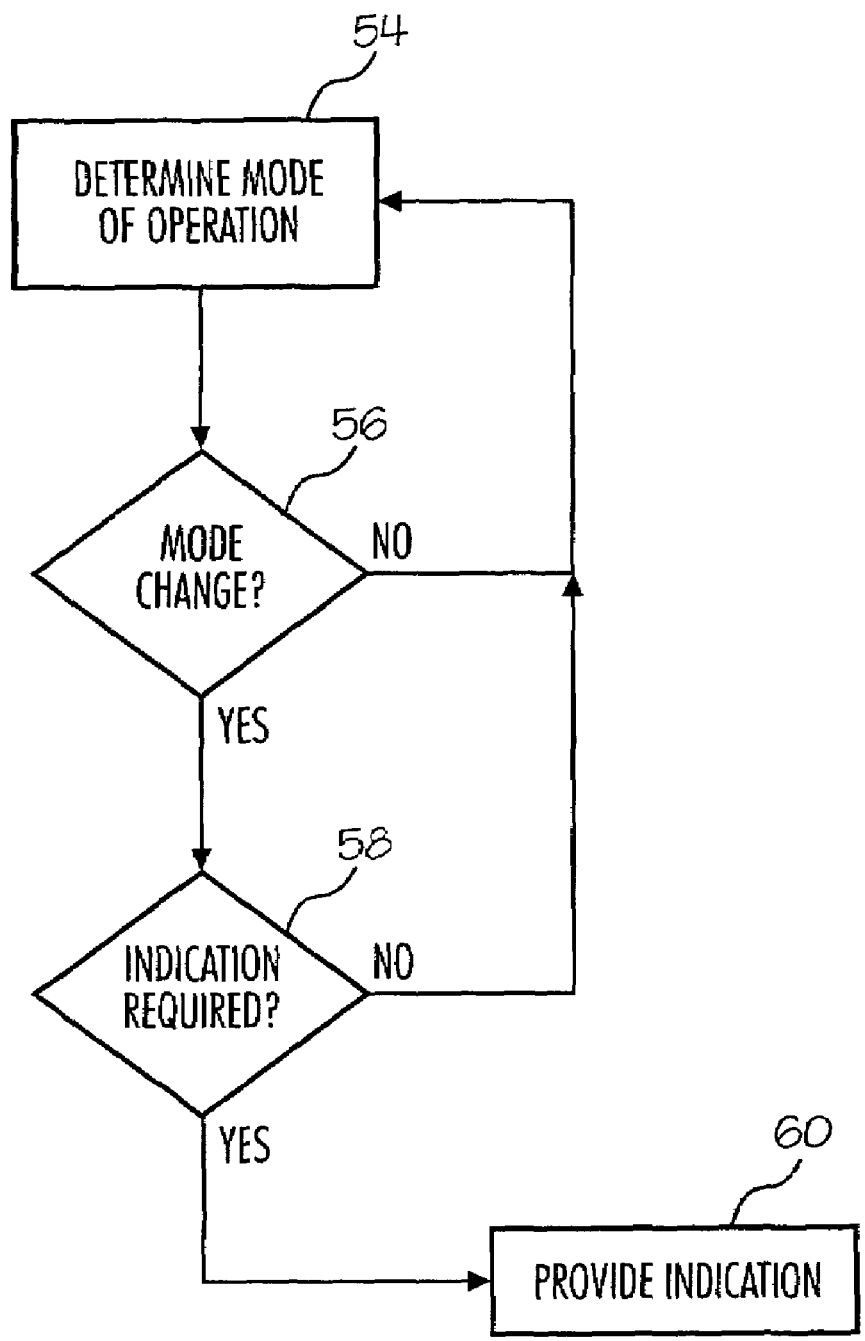
FIG. 6 is a flowchart representing a method of employing the CAS of FIG. 3 to enhance operational awareness of the CAS, in accordance with systems and methods of the present invention.

Referring to FIG. 6, a flowchart depicts a method of employing CAS 12 to enhance the awareness of the operation of CAS 12 for the occupant(s) of aircraft 10. Those skilled in the art appreciate that one or more programs and/or data 24 in storage system 22 may be utilized by computer unit 20 to so direct and coordinate operation of CAS 12, as shown in FIG. 3. For purposes of setting a context, aircraft 10 with CAS 12 may be engaged in any operation, whether or not aircraft 10 is a member of an aircraft formation.

In step 54, aircraft 10 may determine with computer unit 20 the current mode of operation for CAS 12. Such a determination may include, but is not limited to reading data in storage system 22 and/or reading one or more CAS mode-of-operation selections from controller 30. A mode of operation for CAS 12 may comprise any predefined operational format for CAS 12, which may include but is not limited to any selection or combination of selections that may be made with controller 30, such as the OFF mode, the TA ONLY mode, the TA/RA mode, the FORMATION mode and the REFUEL mode. A mode of operation for CAS 12 may also comprise any change to any surveillance characteristic of CAS 12, such as altering the surveillance volume for CAS 12.

In step 56, aircraft 10 may evaluate with computer unit 20 whether there has been a change in the mode of operation of CAS 12 by comparing the results of the most recent consecutive pair of iterations of step 54. A change in the iteration results may indicate a change in the mode of operation for CAS 12. Based on the determination of step 56, the process passes to step 54 when there has been no change to the mode of operation for CAS 12 and to step 58 when there has been a change.

In a variation of steps 54 and 56, instead of monitoring for changes in CAS mode of operation iteratively, a signal may be provided to computer unit 20 anytime that a change in mode of operation occurs to identify the new mode of operation for CAS 12.

In step 58, aircraft 10 may evaluate with computer unit 20 whether to report the change in the mode of operation for CAS 12. Such an evaluation may include, but is not limited to reading data in storage system 22. Based on the determination of step 58, the process passes to step 54 when there is no need to report the change in the mode of operation for CAS 12 and to step 60 when there is such a need.

In step 60, an indication may be provided in response to a signal that may be provided by computer unit 20 of CAS 12 to indicate to the occupant(s) of aircraft 10 that there may have been a change in mode of operation for CAS 12. Those skilled in the art understand that the signal that causes issuance of such an indication may be provided from any part of CAS 12 or elsewhere on aircraft 10. Such an indication may be provided in any way, including but not limited to visually and/or aurally.

Figure 7:
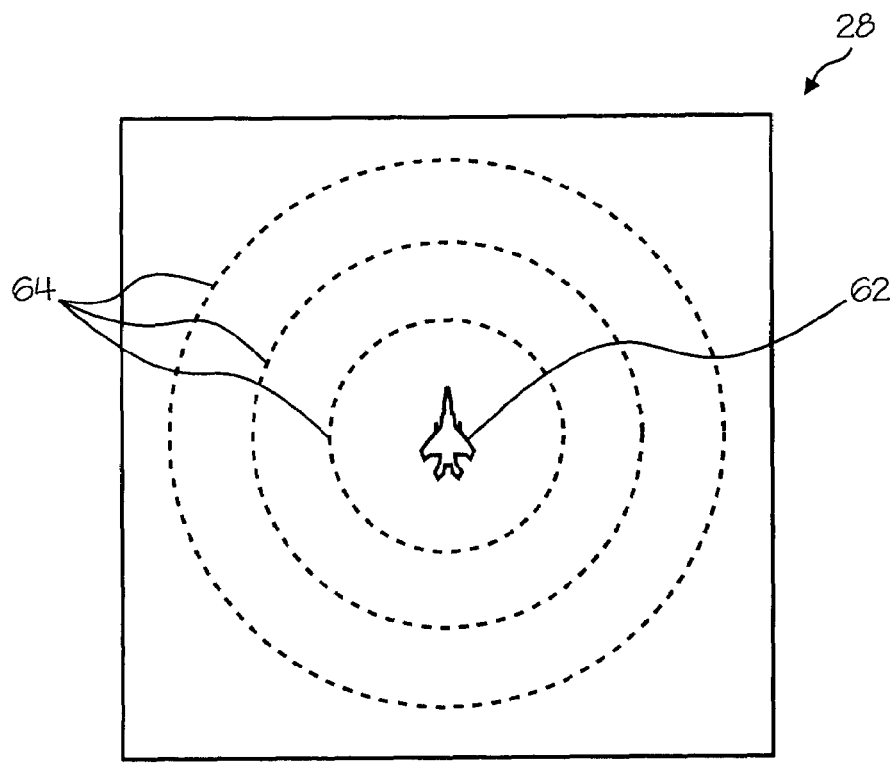
FIG. 7 is a displayed view including an own aircraft symbol provided by the CAS of FIG. 3, in accordance with systems and methods of the present invention.
Figure 7A:
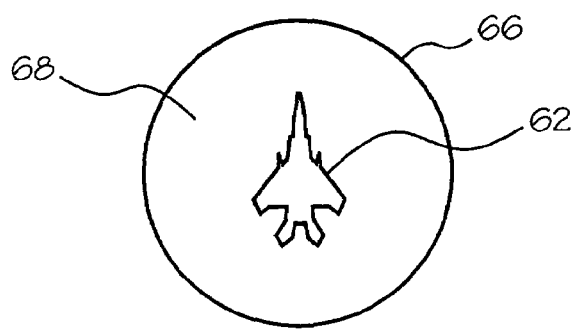
FIG. 7A is a close up and modified view of the own aircraft symbol of FIG. 7, the modification being an additional displayed object in proximity to the own aircraft symbol, in accordance with systems and methods of the present invention.

Display 28 may provide a visual indication of a change in the mode of operation of CAS 12 by, for example, changing the appearance of a displayed symbol 62 for own aircraft 10, as shown in FIG. 7 with range rings 64 around own aircraft symbol 62. Changing the appearance of own aircraft symbol 62 may include, but is not limited to one or more of changing its color, size and shape; periodically interrupting its display; and adding at least one further displayed object in proximity to own aircraft symbol 62. FIG. 7A shows an example of the latter change, adding at least one further displayed object 66 in proximity to own aircraft symbol 62, such as a circle 66 bounding an area 68, which may represent a region where display of one or more aircraft 10 may be inhibited to reduce screen clutter and complexity. The further displayed object 66 may be any displayed object of any size, shape, color, or any other visual characteristic. In a variation, the further displayed object may only partially surround own aircraft symbol 62. Multiple variations of own aircraft symbol 62 may represent a multitude of different communications to an aircraft occupant, such as the present one of several different possible modes of operation for CAS 12.

Speaker 32 may provide an aural indication of a change in the mode of operation of CAS 12 by, for example, playing any unique sound or series of sounds that so inform the occupant(s) of aircraft 10. Such a unique sound or series of sounds may comprise any, such as an announcement, that may communicate to the occupant(s) of aircraft 10 the change in the mode of operation of CAS 12. Exemplary announcements may include any one or more of, but are not limited to "traffic advisory mode," "TA mode," "resolution advisory mode," "RA mode," "TA/RA mode," "formation mode," "limited surveillance," "reduced surveillance" and "ATC off."

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of employing a collision avoidance system for an aircraft that is a member of a formation to distinguish between members and nonmembers of the formation, the method comprising:
   providing a signal used to indicate that one or more other aircraft has attained at least one of a predefined spatial condition and a predefined temporal condition; and
   generating an announcement in response to the signal;
   wherein the announcement distinguishes between civilian aircraft and military aircraft.

2. The method of claim 1 wherein the signal is provided by the collision avoidance system.

3. The method of claim 1 wherein the aircraft and the one or more other aircraft are military aircraft.

4. The method of claim 1 wherein the announcement is not a traffic advisory.

5. The method of claim 1 wherein the announcement does not comprise "traffic traffic."

6. The method of claim 1 wherein the announcement comprises at least one of "monitor member," "traffic monitor traffic," "monitor traffic," "member traffic," "encroachment" and "monitor encroachment."

7. The method of claim 4 wherein the at least one of the predefined spatial condition and the predefined temporal condition is different from another predefined condition that results in issuance of the traffic advisory.

8. The method of claim 4 wherein the at least one of the predefined spatial condition and the predefined temporal condition matches another predefined condition that results in issuance of the traffic advisory.

9. A method of employing a collision avoidance system for an aircraft that is engaged in a refueling operation, the method comprising:
   providing a signal used to indicate attainment of a predefined condition for the refueling operation; and
   generating an announcement in response to the signal;
   wherein the announcement pertains to at least one of vertical and horizontal distance between aircraft engaged in the refueling operation.

10. The method of claim 9 wherein the signal is provided by the collision avoidance system.

11. The method of claim 9 wherein the predefined condition is at least one of a predefined spatial condition and a predefined temporal condition.

12. A method of employing a collision avoidance system for an aircraft to enhance awareness of operation of the collision avoidance system, the method comprising providing a signal used to aurally indicate a change in a mode of operation of the collision avoidance system.

13. The method of claim 12 wherein the signal is provided by the collision avoidance system.

14. The method of claim 12 further comprising generating an announcement in response to the signal.

15. The method of claim 14 wherein the announcement comprises at least one of "collision avoidance off," "traffic advisory only," "TA ONLY," "traffic advisory resolution advisory," "TA/RA," "formation," "refuel," "limited surveillance," "reduced surveillance," "air traffic control off" and "ATC off."

16. The method of claim 12 wherein the change in the mode of operation is automatic once a predefined condition is attained.

17. The method of claim 12 wherein the change in the mode of operation is manually initiated.

18. The method of claim 12 wherein the change in the mode of operation comprises a change in surveillance volume for the collision avoidance system.

19. A method of employing a collision avoidance system for an aircraft to enhance awareness of operation of the collision avoidance system, the method comprising:
   providing a signal used to indicate a change in a mode of operation of the collision avoidance system; and
   modifying a displayed view of an own aircraft symbol in response to the signal.

20. The method of claim 19 wherein the modifying comprises at least one of modifying color of the own aircraft symbol, modifying size of the own aircraft symbol, modifying shape of the own aircraft symbol, periodically interrupting display of the own aircraft symbol, and adding at least one further displayed object in proximity to the own aircraft symbol.

21. The method of claim 20 wherein the further displayed object bounds an area in proximity to the own aircraft symbol.

22. The method of claim 21 wherein displayed view of at least one other aircraft is inhibited in the area.

23. A method of employing a collision avoidance system for an aircraft that is a member of a formation to distinguish between members and nonmembers of the formation, the method comprising:
   providing a signal used to indicate that one or more other aircraft has attained at least one of a predefined spatial condition and a predefined temporal condition; and
   generating an announcement in response to the signal;
   wherein the announcement comprises at least one of "monitor member," "traffic monitor traffic," "monitor traffic," "member traffic," "encroachment" and "monitor encroachment."

\* \* \* \* \*